Figure 1:
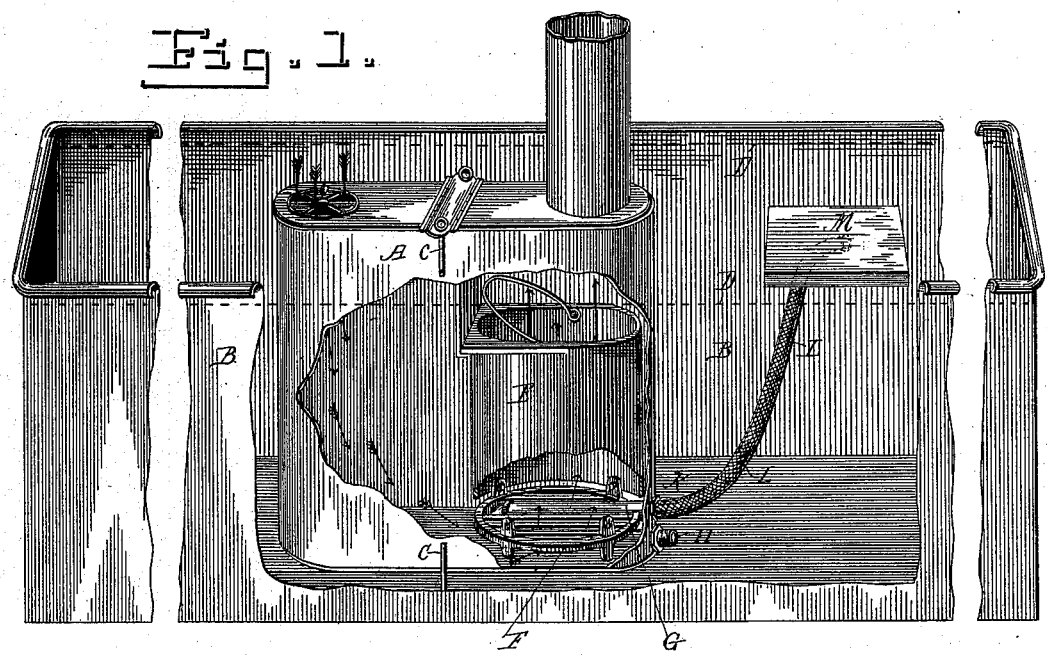

(No Model.)

A. J. UPHAM.
TANK HEATER.

No. 402,633.        Patented May 7, 1889.

WITNESSES

INVENTOR
Andrew J. Upham
By John G. Manahan
Attorney

UNITED STATES PATENT OFFICE.

ANDREW J. UPHAM, OF SYCAMORE, ILLINOIS.

TANK-HEATER.

SPECIFICATION forming part of Letters Patent No. 402,633, dated May 7, 1889.

Application filed January 12, 1889. Serial No. 296,152. (No model.)

*To all whom it may concern:*

Be it known that I, ANDREW J. UPHAM, a citizen of the United States, residing at Sycamore, in the county of De Kalb and State of Illinois, have invented certain new and useful Improvements in Tank-Heaters; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

In the class of tank-heaters referred to the heater is submerged within the water to be heated as far as it can be done without permitting the water to run over and into the top of such heater, and one or more turns or coils of tube or pipe are projected from the exterior of the heater into the fire-box thereof, the extremities of such pipe or tube communicating with the water upon the outside of said heater, by means whereof a portion of such external water is constantly passing through said tube or pipe, and, after being heated therein, returning into the tank.

The heater is submerged, as aforesaid, for the purpose of getting the benefit of all the radiation, and said circulating-pipes are necessarily placed low in the heater, so as to be always below the line of water in the tank to insure the inflow, and also to secure a degree of pressure at the inlet end of said tube or pipe, and further in order to utilize the circulating character of heating at such times as there might be very little water in the tank. It is understood of course that stock have access to the water in the tank nearly constantly and their drinking therefrom varies the height thereof; and my invention has for its object, broadly, the discharge of the heated water constantly at or near the upper surface of the water in the tank whatever varying altitude the latter water may have. This I accomplish by attaching flexibly or by a suitable joint a portion of hose, or any suitable tubing, to the exit end of the tube which passes through the fire-box, as aforesaid, and supporting the upper and free end of such hose or tube upon a float supported in turn by the water at or near the upper surface of the latter. Through this flexible jointed or hinged tube the water readily passes from the fire-box, and is discharged at or slightly under the upper surface of the standing water in the tank.

The advantages of my invention are several. Many of these water-tanks contain from forty to fifty barrels of water, and the heating of the entire body thereof in the ordinary construction not only requires a large amount of fuel, but involves quite a delay before the water is sufficiently heated at the top, while in my invention by discharging the heated water at the top of the main body of the heater the heating is accomplished at once, the stock can begin drinking, and the delay and expense of heating the entire body of water are avoided. Again, by discharging the heated water near the top of the main body thereof less heat is required to effect the necessary circulation than where the entrance and exit tubes adjacent to the fire-box are at substantially the same altitude. In the latter instance the pressure against the exit of the water is about equal to that against the entrance-port, and in order to accomplish the circulation of water through the heated tube heat enough must be generated to destroy this equipoise; but in my construction the entrance-port is near the bottom of the tank of water, and where the pressure of the latter is the greatest, while the final discharge is near the top of the tub of water, where the pressure of the latter is at its minimum. The difference between the pressure of the external water at the points of entrance and exit of the heating-coil is in my invention so great that but very little heat is required within the fire-box to incite and sustain the necessary circulation. This of course involves saving of both time and fuel.

An automatic vertical adjustment of the discharge of the pipe or tube is rendered necessary by the variant altitudes of the water within the tank. It is essential that said discharge end shall never extend materially above the then water-line, because in that event the water would not rise enough above the "head" to insure a satisfactory discharge.

Figure 2:
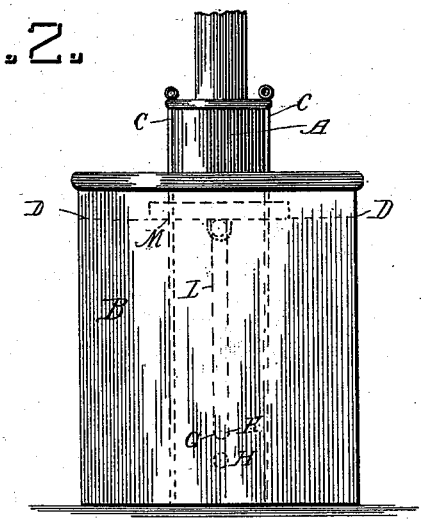

In the drawings, Figure 1 represents the perspective of the side of a tank-heater provided with my invention and in its operative position within the usual water-tank. Fig. 2 is an end view.

A is a tank-heater, which may be of any of the usual constructions and designed to be seated in the tank B, and held in place therein by the ordinary rods, C C, suitably fastened in or through the bottom of said tank. The water-line in said tank is represented by dotted lines, (marked D,) although it must be understood that the altitude of said water-line with reference to the tank is constantly changing when the tank is in use, and its altitude at any time is contingent upon the amount of supply and the quantity drunk therefrom by the stock.

E represents the usual fire-box, provided with the grate F.

G is a tube extending from the interior of the tank B within the fire-box E, and after having one or more turns or coils within said fire-box is returned through the outer wall of said heater. Both ends of the pipe G have communication with the water in the tank B outside of the heater A.

H represents the entrance-port of said tube, and K the exit-port.

In the ordinary uses of the devices thus described the water would pass in at H, and after being heated within the tube G sufficiently to cause the circulation therein would pass out of the exit-port K.

L is a swinging pipe or tube of any suitable material fastened at its lower end to and communicating with the exit end K of the tube G, and supported at its upper end at or slightly below the water-line by the float M, to which said pipe or tube L is suitably attached. The float M is supported at the surface of the water by its own buoyancy, and of course follows the varying altitudes of the water within the tank and adjusts the discharge end of the pipe or tube L, so that said discharge end will be always at or slightly below the water-line whatever the altitude of the water.

The tube L may be flexible throughout or it may be jointed or hinged at its connection with the exit K of tube G, or at any point or points intermediate its length, the only requirement in that behalf being that the tube L shall at its lower end have communication with the tube G, be supported at its discharge end by an automatically-adjustable float or its equivalent, and be capable of vertical oscillations at its discharge end. Neither is it essential to the operation of my invention that the heater be seated within the tank.

What I claim as my invention, and desire to secure by Letters Patent of the United States, is—

1. In combination with the heater A, designed for submersion within a tank of water and provided with the heating coil or tube G, a discharge-tube, L, attached at one end of the exit of said tube G and supported at its outer and discharge end adjustably at or near the water-line of the water within said tank, and means for adjustably supporting the discharge end of the tube G, substantially as shown, and for the purpose described.

2. The combination of the tank B, the tank-heater A, the tube G, having communication at each end with the water in said tank, the adjustable tube L, attached at one end to the exit of said tube G and projected in an upward direction, and the float M, suitably supported upon the water within said tank and in turn supporting the discharge end of tube L, substantially as shown, and for the purpose described.

3. In combination with a tank-heater provided with the water-circulation within its fire-box, of a float, M, and a tube, L, flexibly or removably connected at one end with the exit-port of said water-circulation and supported at its other end by said float suitably buoyed upon the water in said tank, substantially as shown, and for the purpose described.

4. In a tank-heater, the combination of the heater A, heating tube or coil G, seated within said heater, the adjustable tube L, attached to the exit K of tube G, and a suitable float, M, attached to and adjustably supporting the discharge end of said tube L, substantially as shown, and for the purpose described.

In testimony whereof I affix my signature in presence of two witnesses.

ANDREW J. UPHAM.

Witnesses:
CHAS. H. WOODBURN,
JOHN G. MANAHAN.